No. 734,210. PATENTED JULY 21, 1903.
C. WHITFORD.
FISH SCALER.
APPLICATION FILED MAY 18, 1903.
NO MODEL
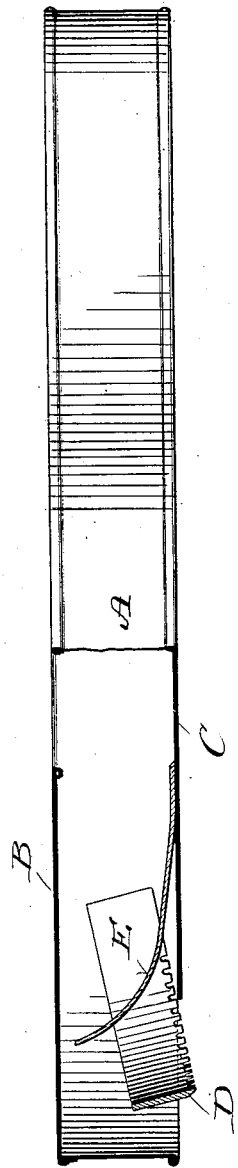
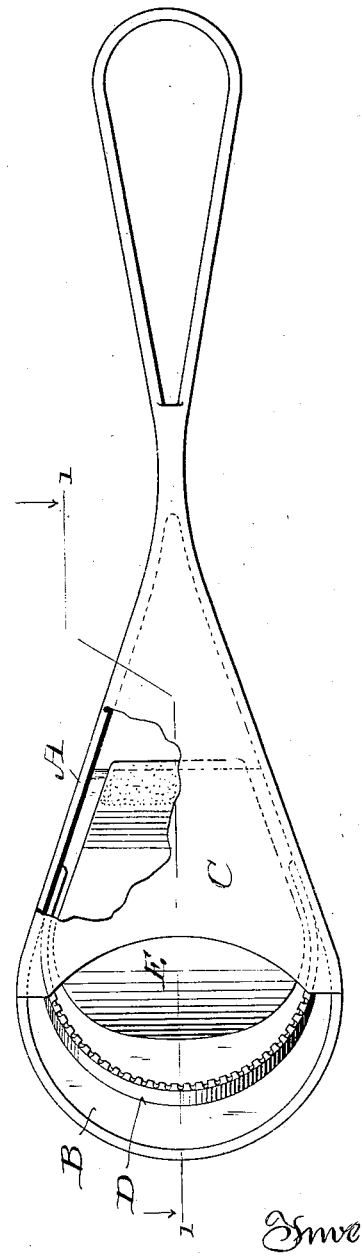

No. 734,210. Patented July 21, 1903.

UNITED STATES PATENT OFFICE.

CHARLES WHITFORD, OF MADISON, WISCONSIN.

FISH-SCALER.

SPECIFICATION forming part of Letters Patent No. 734,210, dated July 21, 1903.

Application filed May 18, 1903. Serial No. 157,518. (No model.)

*To all whom it may concern:*

Be it known that I, CHARLES WHITFORD, a citizen of the United States, and a resident of Madison, in the county of Dane and State of Wisconsin, have invented certain new and useful Improvements in Fish-Scalers; and I do hereby declare that the following is a full, clear, and exact description thereof.

My invention has for its object to provide simple, economical, and efficient implements for rapid scaling of fish; and it consists in certain peculiarities of construction and combination of parts hereinafter particularly set forth with reference to the accompanying drawings and subsequently claimed.

Figure 1 of the drawings represents a side elevation of a fish-scaler in accordance with my invention, partly broken away; and Fig. 2, a plan view of the same inverted and partly broken away.

Referring by letter to the drawings, A indicates a frame that is herein shown as being preferably made from a strip of suitably-wide sheet metal, that is preferably tinned, galvanized, or otherwise treated to render it rust-proof. To stiffen the sheet-metal strip, its edges are beaded or wired, and the frame made from said strip has looped ends and inwardly-curved sides, these sides and the ends of the strip being joined by solder or otherwise. The handle portion of the frame or its loop of least area is in rear of where its sides are joined, and a preferably rust-proof plate B partly covers the forward or larger loop of said frame, an opening being left in rear of the plate. A bottom plate C is made fast to the larger loop of frame A, an opening being left forward of the latter plate, and the forward edge of this plate is for the most part preferably concave.

Made fast by solder or otherwise in the forward portion of the frame A are the ends of a bowed scraper D, set at an angle and having a toothed lower edge. The toothed scraper projects forward of the bottom plate C aforesaid and is partly below the same, the front of its teeth being preferably beveled to increase their efficiency.

Soldered or otherwise rigidly secured on the bottom plate C is the rear end of an upwardly-bent deflector E, back of the scraper.

The deflector and top plate of the herein-described implement prevent fish-scales removed by the scraper D from flying upward, and said scales are caused to fall forward of said scraper between it and the bowed forward end of the frame A out of the way.

Experiment has demonstrated that the herein-described implement will rapidly and thoroughly remove the scales from fish when properly operated, and it may be readily cleaned by rinsing, the upper rear and lower front portions of said implement affording outlets for the rinse-water.

While I have described the frame of the implement as being made of a strip of stiffened sheet metal, it may be casting with one or the other of the upper and lower forward plates, and its handle may vary in contour from what is herein shown.

Having thus described my invention, what I claim as new, and desire to secure by Letters Patent, is—

1. A fish-scaler comprising a frame having a loop end closed at the top and bottom to leave a rear upper opening and forward bottom opening, a bowed toothed-edge scraper set at an angle in the frame to project below and forward of the lower closed portion of the same, and an upwardly-bent deflector arranged on the frame-bottom back of the scraper.

2. A fish-scaler comprising a stiffened sheet-metal frame having looped ends and inwardly-curved and connected sides, a top plate and bottom plate in connection with the forward loop of the frame to leave rear upper and lower front openings, a bowed toothed-edge scaler set at an angle in the frame to project below and forward of the bottom plate, and an upwardly-bent deflector arranged in connection with said bottom plate back of the scraper.

In testimony that I claim the foregoing I have hereunto set my hand, at Madison, in the county of Dane and State of Wisconsin, in the presence of two witnesses.

CHARLES WHITFORD.

Witnesses:
C. C. REINEL,
JOHN GEO. OTT.